United States Patent [19]

Braus et al.

[11] Patent Number: 4,514,535
[45] Date of Patent: Apr. 30, 1985

[54] ELECTRICAL TREE AND WATER TREE RESISTANT COMPOUNDS AND POLYMER COMPOSITIONS CONTAINING THE SAME

[75] Inventors: Harry Braus; Anthony Barlow; Melvin F. Maringer, all of Cincinnati, Ohio

[73] Assignee: National Distillers and Chemical Corporation, New York, N.Y.

[21] Appl. No.: 575,977

[22] Filed: Feb. 1, 1984

[51] Int. Cl.$^3$ ................................................ C08K 5/52
[52] U.S. Cl. ............................ 524/109; 174/110 PM; 174/110 SR
[58] Field of Search ..... 524/109, 111, 147, DIG. 912; 174/110 PM, 110 SR

[56] References Cited

U.S. PATENT DOCUMENTS 4,098,976 7/1978 Caunt ................................. 526/351
4,100,089 7/1978 Cammarack et al. .............. 524/137
4,233,470 11/1980 Wright ................................ 524/303

OTHER PUBLICATIONS

James P. Scullin et al., "The Relationships Between the Structures of Organic Phosphites and Their Effectiveness in Poly(Vinyl Chloride) Stabilization"-SPE Transactions, Jan. 1962, 28-30.

Anthony D. Caunt-Chemical Abstracts 78 125196K, (1973).

Fernand Chevassus et al-The Stabilization of Polyvinyl Chloride, 255-286, 1963.

Primary Examiner—Veronica P. Hoke
Attorney, Agent, or Firm—Kenneth D. Tremain

[57] ABSTRACT

Organophosphorous phosphites having the formula

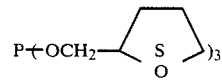

useful as water tree and electrical tree retardant additives for polymeric compositions.

19 Claims, No Drawings

ELECTRICAL TREE AND WATER TREE RESISTANT COMPOUNDS AND POLYMER COMPOSITIONS CONTAINING THE SAME

BACKGROUND OF THE INVENTION

This invention relates to certain substituted phosphites and polymeric compositions containing said substituted phosphites having increased resistance to electrical treeing and water treeing, said compositions being useful as insulation for electrical cables.

Polymeric compositions are well-known and are used extensively as insulation materials for wire and cable. As an insulator, it is important that the composition have various physical and electrical properties, such as resistance to mechanical cut through, stress crack resistance and dielectric failure. Recent publications have indicated that water tree growth and electrical tree growth in the insulation are particularly important problems since they are associated with, though not necessarily totally responsible for, dielectric failure.

An important application for an insulation material is in high voltage transmission and distribution cable, especially in direct buried underground service and three types of trees have been observed in power cables, to wit, electrical trees, water trees and electrochemical trees. It is generally believed that electrical trees are generated by corona discharges causing fusion and breakdown of the polymer, whereas water trees are usually observed in cables buried in wet locations and have a different appearance compared to the electrical trees. The electrochemical trees are similar to the water trees but are characterized by the presence of metal ions in the trees.

U.S. Pat. No. 4,144,202 granted to Ashcraft et al. relates to inhibiting the electrical breakdown of insulation by water treeing in dielectrical materials based on ethylene polymers. This patent discusses electrical failures which are due to treeing and explains the concept of treeing and some of the causes for treeing. In general, as the polymeric composition breaks down the damage progresses through the insulator, or dielectric, in a path that looks something like a tree. Treeing usually is a slow type failure and may take years to cause a failure in the insulation. As disclosed in the patent, water treeing is inhibited in the ethylene polymer compositions by employing therein certain organo silane compounds. In particular, the organo silane is a silane containing an epoxy containing radical. Suitable polymers, adjuvants and processing procedures for preparing the composition are described in the patent, which patent is hereby incorporated by reference.

U.S. Pat. No. 4,206,260 granted to McMahon relates to insulation particularly suitable for high voltage power cable containing an effective amount of an alcohol of 6 to 24 carbon atoms which imparts electrical tree growth resistance to the composition. This patent, as in U.S. Pat. No. 4,144,202, supra, contains a discussion of the electrical treeing problem in polymer composition and cites numerous patents attempting to overcome this problem. Suitable polymers, adjuvants and preparation procedures are noted therein and this patent is hereby incorporated by reference.

German Offenlegungsschrift No. 2,737,430 discloses that certain alkoxysilanes added to polyolefin insulation prevent water-free formation. Several trimethoxy and triethoxy silanes are said to be useful.

U.S. Pat. No. 3,553,348 granted to Betts, British Pat. No. 1,248,256 granted to General Electric Company and British Pat. No. 1,277,378 granted to General Electric Company relate to mineral filled polymer compositions useful as electrical wire and cable insulation. The mineral filler is treated with an organosilane such as an alkyl alkoxysilane or a vinyl alkoxysilane to decrease the porosity of the composition.

SUMMARY OF THE INVENTION

It is one object of the present invention to provide certain substituted phosphites, particularly useful as water tree and electrical tree retardant additives.

Another object of this invention is to provide polymeric compositions containing said substituted phosphites which exhibit enhanced resistance to water treeing and electrical treeing properties.

These and other objects are accomplished herein by providing polymeric compositions containing a substituted phosphite having the general formula:

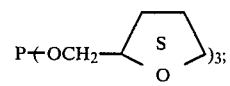

i.e. tristetrahydrofurfuryloxy phosphite.

DETAILED DESCRIPTION OF THE INVENTION

The substituted phosphite of the present invention is a known compound and can be obtained commercially or can be readily synthesized. For example this phosphite is prepared by contacting a tetrahydrofurfuryl alcohol with phosphorus trichloride in the presence of a hydrogen halide receptor, such as pyridine, methylamine, etc.

In general the polymers suitable for the practice of this invention include any normally solid synthetic organic polymeric thermoplastic resin. Included are polyolefins and copolymers thereof, vinyls, olefinvinyl copolymers, olefin-allyl copolymers, polyamides, acrylics, polystyrenes, cellulosics, polyesters and fluorocarbons.

The polyolefins include normally solid polymers of olefins, particularly mono-alpha-olefins, which comprise from about two to about six carbon atoms, e.g., polyethylene, polypropylene, polybutene, polyisobutylene, poly(4-methyl-pentene), and the like. Preferred polyolefins are polyethylene and polypropylene. Polyethylene is especially preferred. Specific polyethylenes include linear low density polyethylene, high density polyethylene and low density polyethylene. An especially preferred polyethylene because of its demonstrated effectiveness is termed NA 310 and is sold by National Distillers and Chemical Company.

Copolymers of ethylene, and other compounds interpolymerizable with ethylene such as butene-1, pentene-1, styrene and the like may be employed. In general the copolymer will comprise about 50 weight % or more ethylene. Other copolymers, such as ethylene-propylene rubber (EPR) and ethylene-propylene-diene monomer (EPDM) and also contemplated herein.

Suitable vinyl polymers include polyvinyl chloride, polyvinyl acetate, vinyl chloride/vinyl acetate copolymers, polyvinyl alcohol and polyvinyl acetal.

Suitable olefin-vinyl copolymers include ethylenevinyl acetate, ethylene-vinyl propionate, ethylene-vinyl isobutyrate, ethylene-vinyl alcohol, ethylene-methyl acrylate, ethylene-ethyl acrylate, ethylene-ethyl methacrylate, and the like. In general the ethylene constitutes at least about 25% of the copolymer by weight.

Olefin-allyl copolymers include ethylene-allyl benzene, ethylene-allyl ether, ethylene-acrolein, and the like.

When it is desired to use a polymeric composition which can be crosslinked, crosslinking can be accomplished by any of the known procedure such as chemical means including peroxide cross-linking; by radiation using electron accelerators, gamma-rays, high energy radiation, such as X-rays, microwaves etc.; or by thermal crosslinking. The basic procedures for crosslinking polymers are extremely well known to the art and need not be described here in detail.

Conventional crosslinking agents such as organic peroxides may be suitably employed. Typical organic perioxide free radical generators include dicumyl peroxide; 2,5-bis (tert.-butylperoxy)-2,5-dimethylhexane; di-t-butyl peroxide; benzoyl peroxide; $\alpha,\alpha'$bis(t-butyperoxy) diisopropyl benzene and the like, as discussed in U.S. Pat. No. 3,287,312. The amount of organic peroxide, when employed, will range from about 0.5 to 5.0 by weight based on the total weight of the composition, or about 0.5 to 10 phr, preferably 3 to 6 phr.

Minor amounts of other additives may also be employed in conventional amounts to obtain the desired results. Conventional antioxidants such as the hindered phenols, polyquinolines and the like may be employed. Other ingredients that may be included are plasticizers, dyes, pigments, heat and light stabilizers, antistatic agents and the like.

The compositions of this invention are generally unfilled polymer compositions. The term "unfilled" as applied to the instant composition shall mean a composition which contains less than 10% of a conventional polymer filler. For certain applications and to meet particular specifications the unfilled compositions herein may contain no filler. The compositions of this invention may contain, therefore, 0 to less than 10% filler. When polymers such as ethylene-propylene rubber (EPR) and ethylene-propylene-diene monomer (EPDM) are employed however, from about 20% to about 30% filler are generally used. Such compositions are also intended to be within the scope of this invention. Accordingly, fillers, such as mineral fillers, may be employed to this limited extent in preparing the compositions of the invention, but in the particularly preferred embodiment and for certain uses, these compositions contain no fillers.

The polymer compositions of this invention can be prepared by mixing the various ingredients. When the organic compound and the polymeric component are mixed together to form the instant compositions, the organic compound and polymeric component are homogeneously dispersed in each other. The order of mixing and specific procedure employed are not critical except to the extent that from the time the peroxide is added, if employed, the temperature is less than about 130° C. in order to prevent premature curing of the composition. This precaution, however, is conventional in the art.

The components may be mixed on a variety of apparatus including multi-roll mills, screw mills, continuous mixers, compounding extruders and Banbury mixers.

Generally, amounts of phosphite employed in the polymeric composition are any amounts which will effectively inhibit water treeing and/or electrical treeing. These amounts have been found to be in the range of from about 0.1 to about 5% based on the amount of resin.

After being extruded onto wire or cable, or other substrate, the crosslinkable compositions are vulcanized at elevated temperatures, e.g., above about 180° C. using conventional vulcanizing procedures.

In order to determine the utility and effectiveness of the polymeric compositions of the present invention with regard to its inhibiting effect of the water treeing and the electrical treeing thereof, the compositions were evaluated by the use of accelerated tests.

Electrical tree tests were performed using the method similar to that in IEEE Conference Paper No. C73, 257-3 1973 by E. J. McMahon and J. R. Perkins. Strips of material approximately 1" wide were cut from a ¼" thick compression molded plaque. The block was machined to give a strip having parallel edges 1" apart. The strip was then cut into 1" square blocks. A blunt needle and a sharp needle were inserted into opposite parallel edges, at elevated temperatures, so that the points were ⅛" apart. Needle insertion and cooling of the sample was performed slowly to avoid inducing thermal or mechanical stresses in the specimen. The sharp needle has a tip diameter of about 0.0002" while the diameter of the blunt needle is 0.002". Eight specimens were prepared and tested simultaneously for each composition. The electrical tree test was performed by energizing the sharp needle at 15 KV using a frequency of 60 Hz; the blunt needle was connected to ground. The time required for each of the eight specimens to fail by tree growth and subsequent electrical short was recorded. The time required for 50% of the samples to fail was employed to characterize the effectiveness of the tree retardant being evaluated.

The water tree test is performed using a procedure similar to that described in U.S. Pat. No. 4,144,202. A compression molded disc about 150 millimeters (mm.) in diameter having 10 conical depressions was prepared for each composition. The geometry of the disc and dimensions of the depressions are substantially the same as shown in U.S. Pat. No. 4,144,202. The base of the disc is sprayed with silver pain which serves as the ground electrode. An acrylic tube 6" long is clamped to the upper face forming a test cell. About 150 ml. of 0.01N sodium chloride solution was poured into the cell and the air bubbles trapped on the surface of the sample were removed. A platinum wire ring was then immersed in the electrolyte and connected to the electrical supply which provides 5 KV at a frequency of 3 KHz. Samples were energized for 22 hours after which time they were removed from the test cell and washed with distilled water. The ten depressions were cut from the disc and stained to make the water trees more visible. This sections were obtained with a microtome, which were then examined microscopically (at 200X) and the tree size measured. Normally fours discs were made for each sample so that the average tree size is calculated from forty individual measurements. In evaluating different tree retardants, the relative tree size was determined by comparing the average tree size obtained on a standard thermoplastic high voltage insulation material containing no tree retardant additives.

Various embodiments of the present invention will now be illustrated by reference to the following specific examples. It is to be understood, however, that such examples are presented for purposes of illustration only,

EXAMPLE 1

TRIS(TETRAHYDROFURFURYL) PHOSPHITE

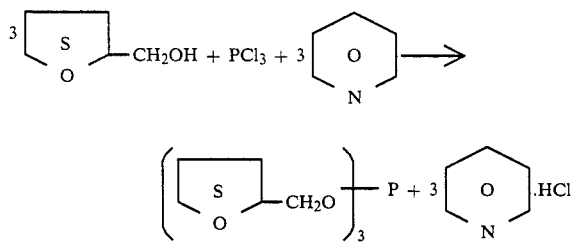

To a 1-liter round bottom flask were added 89.0 ml. (0.9 mole) of tetrahydrofurfuryl alcohol, 78.8 ml. (0.975 mold) of pyridine and 400 ml. of dry toluene. The flask was cooled to 5° C. and a solution of 18.6 ml. (0.3 mole) of phosphorous trichloride in 100 ml. of toluene was slowly added, always maintaining a flask temperature below 15° C. The reaction was then allowed to run at room temperature overnight.

The precipitate was filtered from the solvent containing the product and the toluene was flashed off in a rotatory vacuum apparatus.

The product was purified by distillation. B.P. 181°–2° C. at 0.5 mmHg. Yield 85%.

EXAMPLE 2

The effectiveness of 1.5% wt.% tris(tetrahydrofurfuryloxy) phosphite as a tree retardant additive in polyethylene insulation (NA 310-06) can be seen from the following test data:

|  | Water tree size, μm | Electrical tree Failure time $F_{50}$-mins. |
| --- | --- | --- |
| NA 310-06 (control) | 210 | 75 |
| Tris(tetrahydrofurfuryloxy) phosphite | 75 | 40 |

Obviously, other modifications and variations of the present invention are possible in the light of the above teachings. It is, therefore, to be understood that changes may be made in the particular embodiments of this invention as defined by the appended claims.

We claim:

1. A polymeric composition having enhanced resistance to water treeing and electrical treeing comprising an intimate admixture of a polymeric component and an effective water treeing and/or electrical treeing inhibitor amount of a compound having the structure:

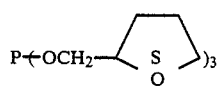

said polymeric component being other than polyvinyl chloride.

2. The polymeric composition of claim 1 wherein the polymeric component is polyethylene.

3. The polymeric composition of claim 1 wherein the polymeric component is a polyolefin.

4. The polymer composition of claim 3 wherein the polymeric component is polypropylene.

5. A polymeric composition as in claim 1 wherein said polymeric component has been crosslinked.

6. A polymeric composition as in claim 1 which is unfilled.

7. A polymeric composition as in claim 1 in which said polymeric component is selected from the group consisting of olefin polymers, vinyl polymers, olefin-vinyl copolymers, olefin-allyl copolymers, polyamides, acrylic polymers, polystyrenes, cellulosics, polyesters and fluorocarbons.

8. A polymeric composition as in claim 7 in which since polymeric component is an olefin polymer.

9. A polymeric composition having enhanced resistance to water treeing and electrical treeing comprising an intimate admixture of a rubber and an effective water treeing and/or electrical treeing inhibitor amount of a compound having the structure:

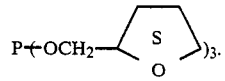

10. A polymeric composition as in claim 9 which contains about 20 to 30% filler.

11. A method of stabilizing a polymeric insulated electrical conductor against water treeing and electrical treeing which comprises:
    coating an electrical conductor with an insulating effective amount of a polymeric insulating composition said composition comprising an intimate admixture of a polymeric component and an effective water treeing and/or electrical treeing inhibitor amount of a compound having the structure:

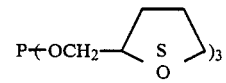

said polymeric component being other than polyvinyl chloride.

12. The method of claim 11 wherein the polymeric component is a polyolefin.

13. The method of claim 12 wherein the polymeric component is polypropylene.

14. The method of claim 12 wherein the polymeric component is polyethylene.

15. The method of claim 11 wherein said polymeric component is selected from the group consisting of olefin polymers, vinyl polymers, olefin-vinyl copolymers, olefin-allyl copolymers, polyamides, acrylic polymers, polystyrenes, cellulosics, polyesters and fluorocarbons.

16. The method of claim 11 wherein said polymeric component is a thermoplastic resin.

17. The method of claim 11 wherein said polymeric component is a rubber.

18. The method of claim 11 wherein said polymeric component is crosslinked.

19. The method of claim 11 wherein said composition contains up to 30% filler.

* * * * *